US010862370B2

(12) United States Patent
Kobayashi

(10) Patent No.: US 10,862,370 B2
(45) Date of Patent: Dec. 8, 2020

(54) WORKING MEDIUM PROPERTY DIFFERENCE POWER GENERATION SYSTEM AND WORKING MEDIUM PROPERTY DIFFERENCE POWER GENERATION METHOD THAT USES THE POWER GENERATION SYSTEM

(71) Applicant: Takaitsu Kobayashi, Urayasu (JP)

(72) Inventor: Takaitsu Kobayashi, Urayasu (JP)

( * ) Notice: Subject to any disclaimer, the term of this patent is extended or adjusted under 35 U.S.C. 154(b) by 0 days.

(21) Appl. No.: 16/604,305

(22) PCT Filed: Feb. 7, 2019

(86) PCT No.: PCT/JP2019/004410
§ 371 (c)(1),
(2) Date: Oct. 10, 2019

(87) PCT Pub. No.: WO2019/167588
PCT Pub. Date: Sep. 6, 2019

(65) Prior Publication Data
US 2020/0052555 A1    Feb. 13, 2020

(30) Foreign Application Priority Data
Mar. 1, 2018    (JP) .................................. 2018-036840

(51) Int. Cl.
*H02K 7/18*    (2006.01)
*F01K 27/00*    (2006.01)
(Continued)

(52) U.S. Cl.
CPC ......... *H02K 7/1884* (2013.01); *F01K 21/005* (2013.01); *F01K 21/04* (2013.01);
(Continued)

(58) Field of Classification Search
CPC ........ F01K 21/04; F01K 21/005; F01K 25/06; F01K 23/04
(Continued)

(56) References Cited

U.S. PATENT DOCUMENTS 3,257,806 A    6/1966  Stahl
3,266,246 A *  8/1966  Heller .................... F01K 23/04
                                                    60/655

(Continued)

FOREIGN PATENT DOCUMENTS

JP    57-97006     6/1982
JP    58-73905     5/1983
(Continued)

OTHER PUBLICATIONS

International Search Report dated May 14, 2019 in International (PCT) Application No. PCT/JP2019/004410.

*Primary Examiner* — Mark A Laurenzi
*Assistant Examiner* — Mickey H France
(74) *Attorney, Agent, or Firm* — Wenderoth, Lind & Ponack, L.L.P.

(57) ABSTRACT

A power generation system and method including a first heat exchanger, a first thermal engine, and a first power generator on a first working medium line L1 that circulates a first working medium W1, a second heat exchanger, a third working medium supply device that supplies a third working medium W3, and a mixing device for mixing a second working medium W2 and the third working medium. A second thermal engine, and a second power generator are included on a second working medium line L2 that circulates the second working medium. On both of a downstream side of the first thermal engine on the first working medium line and a downstream side of the second thermal engine on the second working medium line, a third heat exchanger is included. Also included is a third working medium discharge (Continued)

device for discharging the third working medium to the third heat exchanger.

20 Claims, 12 Drawing Sheets

(51) Int. Cl.
    *F01K 23/04*     (2006.01)
    *F01K 21/04*     (2006.01)
    *F01K 21/00*     (2006.01)
    *F01K 25/06*     (2006.01)

(52) U.S. Cl.
    CPC .............. *F01K 23/04* (2013.01); *F01K 25/06* (2013.01); *F01K 27/00* (2013.01)

(58) Field of Classification Search
    USPC .................................. 60/649, 655, 673–674
    See application file for complete search history.

(56) References Cited

U.S. PATENT DOCUMENTS

| | | | | |
|---|---|---|---|---|
| 3,972,195 | A * | 8/1976 | Hays | F01D 1/06 60/671 |
| 3,974,642 | A * | 8/1976 | Pacault | F01K 3/08 60/39.182 |
| 4,037,413 | A * | 7/1977 | Heller | F02C 1/10 60/655 |
| 4,106,294 | A * | 8/1978 | Czaja | F01K 21/04 60/649 |
| 4,132,077 | A * | 1/1979 | Johnson | F01K 25/10 60/649 |
| 4,249,385 | A * | 2/1981 | Bissell | F01K 21/04 60/649 |
| 4,387,576 | A * | 6/1983 | Bissell | F01K 21/04 60/649 |
| 4,573,321 | A * | 3/1986 | Knaebel | F01K 25/065 60/649 |
| 5,483,797 | A * | 1/1996 | Rigal | F01D 15/10 60/641.2 |
| 2003/0005696 | A1 * | 1/2003 | Wilson | F01N 5/02 60/618 |
| 2008/0289335 | A1 * | 11/2008 | Drysdale | F01D 15/005 60/649 |
| 2009/0188253 | A1 * | 7/2009 | Smith | F01C 21/04 60/657 |
| 2010/0018206 | A1 * | 1/2010 | KaKovitch | B01F 5/0413 60/649 |
| 2010/0242476 | A1 * | 9/2010 | Ast | F01K 25/10 60/645 |
| 2010/0326076 | A1 * | 12/2010 | Ast | F01K 25/10 60/671 |
| 2011/0079015 | A1 * | 4/2011 | Geis | F02C 7/05 60/779 |
| 2012/0006022 | A1 * | 1/2012 | Woodland | F01K 25/06 60/641.2 |
| 2013/0133327 | A1 * | 5/2013 | Milam | F01K 23/04 60/651 |
| 2013/0174551 | A1 * | 7/2013 | Mahmoud | F01K 25/06 60/649 |
| 2013/0241204 | A1 * | 9/2013 | Brookman | F01K 7/165 290/52 |
| 2013/0312414 | A1 * | 11/2013 | Palmer | F01K 17/005 60/645 |
| 2013/0340434 | A1 * | 12/2013 | Palmer | F01K 25/06 60/651 |
| 2014/0026573 | A1 * | 1/2014 | Palmer | F01K 17/005 60/649 |
| 2014/0223911 | A1 * | 8/2014 | Ikegami | F01K 25/065 60/671 |
| 2014/0352307 | A1 * | 12/2014 | Lehar | F01K 23/10 60/647 |
| 2015/0218972 | A1 * | 8/2015 | Ono | F01K 25/065 60/719 |
| 2016/0146517 | A1 * | 5/2016 | Van Beveren | F01K 17/005 60/645 |
| 2016/0297304 | A1 * | 10/2016 | Brookman | B60K 3/02 |
| 2018/0104658 | A1 * | 4/2018 | Kobayashi | B01F 3/04 |
| 2019/0003345 | A1 * | 1/2019 | Pearce | F22B 1/14 |
| 2020/0040771 | A1 * | 2/2020 | Fluck | F01K 25/08 |

FOREIGN PATENT DOCUMENTS

| | | |
|---|---|---|
| JP | 59-200076 | 11/1984 |
| JP | 62-26304 | 2/1987 |
| JP | 01-113506 | 5/1989 |
| JP | 10-205308 | 8/1998 |
| JP | 2015-523491 | 8/2015 |
| JP | 2016-510379 | 4/2016 |

* cited by examiner

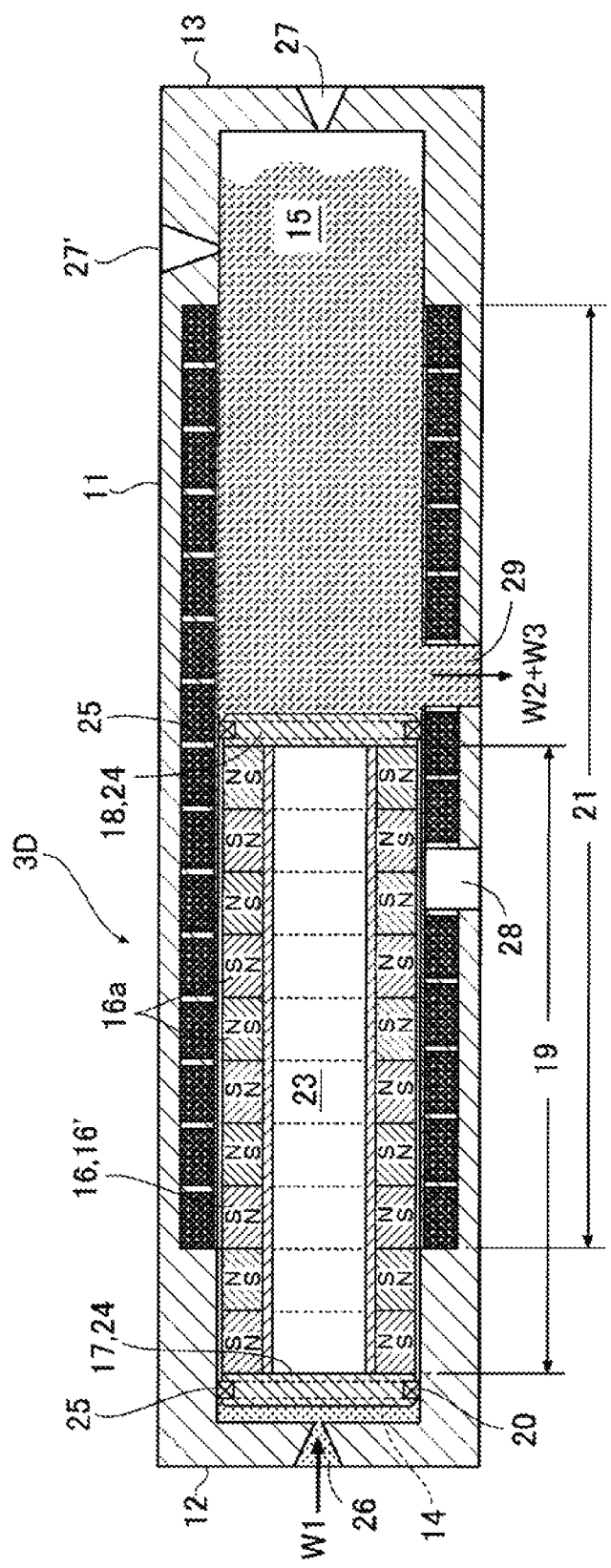

WORKING MEDIUM PROPERTY DIFFERENCE POWER GENERATION SYSTEM AND WORKING MEDIUM PROPERTY DIFFERENCE POWER GENERATION METHOD THAT USES THE POWER GENERATION SYSTEM

BACKGROUND OF THE INVENTION

1. Technical Field

The present invention relates to a power generation device and a power generation method that convert thermal energy taken out from renewable energy, into kinetic energy via a working medium, and convert the kinetic energy into electrical energy.

2. Description of the Related Art

There have been conventionally developed various kinds of power generation systems and power generation methods that finally convert thermal energy existing in a natural world, such as heat that uses water such as seawater, river water, or lake water, as a heat source, solar heat, geothermal heat, or air (atmospheric) heat, which is renewable energy, into electrical energy via a working medium.

In such a power generation system that uses thermal energy in a natural world, a thermal cycle such as Rankine cycle or Kalina cycle is used as a cycle that circulates a working medium including fluid. These thermal cycles include a process of heating and evaporating a working medium using thermal energy in a natural world as a thermal source, a process of converting the thermal energy into kinetic energy using the gaseous working medium in a thermal engine, and further converting the kinetic energy into electrical energy, and a process of cooling and condensing the used working medium using a cold source.

Thus, by performing thermal exchange with the used working medium, a cold source medium obtains thermal energy from the working medium. If electrical energy can be generated by effectively utilizing the thermal energy obtained by the cold source medium, thermal energy in a natural world can be converted into electrical energy without loss. Thus, such a system and a method are desired.

For example, JP 2015-523491 A discloses a power generation system and a power generation method in that regard a cold source medium as a heating agent of a working medium, and give thermal energy obtained by the cold source medium from the used working medium, again to the working medium.

In addition, JP 2016-510379 A discloses a power generation system and a power generation method that use two types of thermal cycles, transmit thermal energy of a used working medium of one thermal cycle, to a working medium of another thermal cycle, that is to say, to a cold source medium of one working medium, and enable power generation to be performed also by the cold source medium.

SUMMARY OF INVENTION

1. Technical Problem

According to the power generation system and the power generation method that are disclosed in JP 2015-523491 A, thermal energy owned by a used working medium can be reused, but there is such a problematic point that, unless a cold source medium (heating agent) is further heated by a thermal source for the reuse, effective thermal energy cannot be transmitted to the working medium.

Thus, while thermal energy to be generated can be saved in the case of using thermal energy artificially generated by combustion or the like, as a thermal source, use of especially effective thermal energy cannot be obtained in the case of using thermal energy in a natural In contrast to this, according to the power generation system and the power generation method disclosed in JP 2016-510379 A, there is such an advantage that thermal energy owned by a used working medium of one thermal cycle can be transmitted to a working medium of another thermal cycle serving as a cold source medium, and the thermal energy can be directly used in the other thermal cycle.

Nevertheless, in the power generation system and the power generation method disclosed in JP 2016-510379 A, there is such a problematic point that hydrogen and oxygen are required to be combusted in one thermal cycle, that is to say, new thermal energy is eventually required to be artificially generated.

2. Solution to the Problem

The present invention provides highly-efficient power generation system and power generation method that can compositely use two thermal cycles and three working media, effectively transmit thermal energy from a working medium of one thermal cycle to a working medium of another thermal cycle while utilizing a property of each working medium, convert the given thermal energy into kinetic energy by the cooperation of two types of working media, and eventually convert the kinetic energy into electrical energy.

In short, a power generation system according to the present invention is a working medium property difference power generation system that uses thermal energy existing in a natural world, as a thermal source of a working medium, and including configurations A to D described below:

A: a first working medium line that circulates a first working medium, and a second working medium line that circulates a second working medium are included;

B: a first heat exchanger for performing thermal exchange between the first working medium and a thermal source medium, a first thermal engine configured to take out kinetic energy from the first working medium heated by the first heat exchanger, and a first power generator configured to convert the kinetic energy taken out by the first thermal engine, into electrical energy are included on the first working medium line;

C: a second heat exchanger for performing thermal exchange between the second working medium and a thermal source medium, a third working medium supply means configured to supply a third working medium to be mixed with the second working medium heated by the second heat exchanger, a mixing means configured to mix the second working medium and the third working medium, a second thermal engine configured to take out kinetic energy from mixed fluid of the second working medium and the third working medium, and a second power generator configured to convert the kinetic energy taken out by the second thermal engine, into electrical energy are included on the second working medium line; and D: on both of a downstream side of the first thermal engine of the first working medium line and a downstream side of the second thermal engine on the second working medium line, a third heat exchanger for performing thermal exchange between the first working medium discharged from the first thermal engine, and mixed fluid of the second working medium and the third working medium that is discharged from the second thermal engine is included, and a third working medium discharge means for discharging the third working medium to the third heat exchanger is included.

Preferably, a compactor configured to compact mixed fluid of the second working medium and the third working medium is included between the mixing means and the second thermal engine on the second working medium line. Kinetic energy can be thereby surely taken out by the second thermal engine from the mixed fluid of the second working medium and the third working medium.

In addition, both of the first thermal engine and the second thermal engine are external-combustion engines. Thermal energy of each of the working media can be thereby converted into kinetic energy without involving combustion.

In addition, a thermal source of a thermal source medium flowing into the first heat exchanger and a thermal source of a thermal source medium flowing into the second heat exchanger are common. Thermal energy in a natural world can be thereby efficiently used and the entire system can be made compact.

Preferably, the first power generator has a configuration including a permanent magnet zone in one of a cylinder and a piston, including an electrogenic coil zone in another one thereof, and including the first thermal engine. Similarly, the second power generator has a configuration including a permanent magnet zone in one of a cylinder and a piston, including an electrogenic coil zone in another one thereof, and including the second thermal engine. Thermal energy can be thereby converted eventually into electrical energy highly efficiently, and the system can be made compact.

More preferably, one common power generator is used as the first power generator and the second power generator. The system can be thereby made compact.

A power generation method according to the present invention is a working medium property difference power generation method that uses the above-described working medium property difference power generation system, and the power generation method includes using fluid having a boiling point lower than a temperature of a thermal source medium flowing into the first heat exchanger, as the first working medium, using fluid having a boiling point higher than a temperature of a thermal source medium flowing into the second heat exchanger, as the second working medium, and using fluid having a boiling point lower than a freezing point of the second working medium, as the third working medium.

For example, pentane, isobutane, ammonia, ammonia-water mixture, or hydrochlorofluorocarbon is used as the first working medium, water is used as the second working medium, and air is used as the third working medium.

In addition, in a mixing means configured to mix the second working medium and the third working medium, a droplet of the second working medium is sprayed into the third working medium. Thermal energy owned by the third working medium is thereby partially surely held in the droplet of the second working medium as evaporative latent heat, and density of the third working medium is made higher.

Preferably, after pressure declined by spraying of the droplet of the second working medium into the third working medium is complemented, mixed fluid of the second working medium and the third working medium is supplied to the second thermal engine. Thermal energy of the mixed fluid of the second working medium and the third working medium can be thereby effectively used.

More preferably, the complementing of the declined pressure is performed in a supply process from the mixing means to the second thermal engine.

In addition, in a supply process to the second thermal engine, mixed fluid of the second working medium and the third working medium is supplied, and the second working medium is further supplied. The density of the third working medium can be thereby made higher.

3. Advantageous Effects of the Invention

According to a power generation system and a power generation method according to the present invention, two thermal cycles and three working media can be compositely used, thermal energy can be effectively transmitted from a working medium of one thermal cycle to a working medium of another thermal cycle while utilizing a property of each working medium, and even if the thermal energy is low level, the thermal energy can be converted into kinetic energy by the cooperation of two types of working media, and eventually into electrical energy.

Thus, thermal energy to be given to each working medium can be covered only by thermal energy in a natural world, and given thermal energy can be used with economy, so that electrical energy can be safely obtained at low cost without applying environmental load.

In addition, if seawater is used as a thermal source, for example, recently-rising temperature of seawater can be lowered, and anomalous occurrence such as typhoon and monsoon that is caused by a seawater temperature rise can be accordingly reduced, thereby contributing to improvement in global environment.

BRIEF DESCRIPTION OF DRAWINGS

FIG. 7C is a vertical cross-sectional view illustrating a state in discharging mix gas of a second working medium and a third working medium (including the added second working medium) in a power generator having a gas pressure cylinder structure.

DETAILED DESCRIPTION OF EMBODIMENTS OF THE INVENTION

Figure 1:
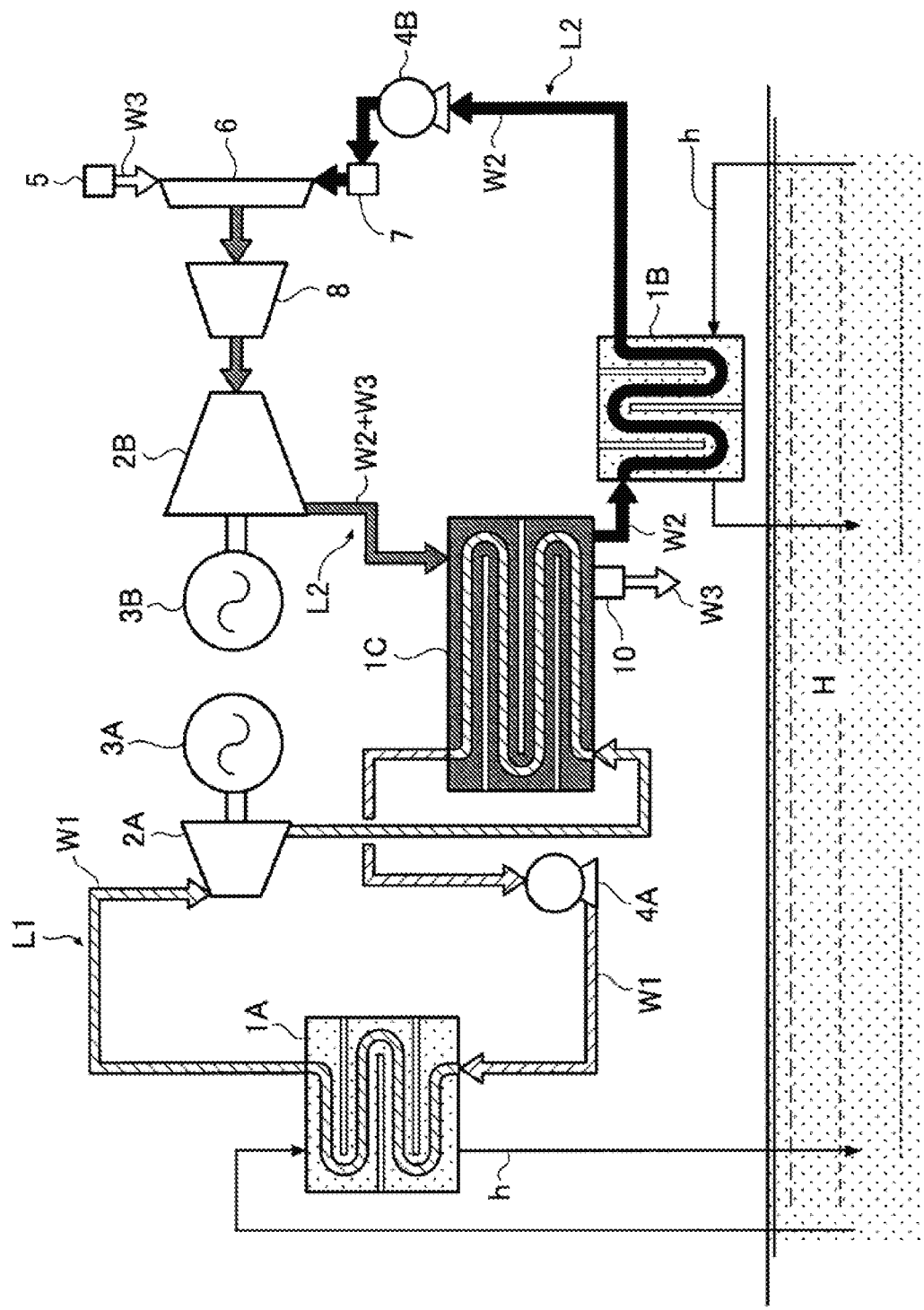
FIG. 1 is a schematic diagram of a working medium property difference power generation system according to a first embodiment.

Hereinafter, the best mode according to the present invention will be described based on FIGS. 1 to 7.

Basic Configuration of Working Medium Property Difference Power Generation System A working medium property difference power generation system according to the present invention assumes that thermal energy existing in a natural world is used as a thermal source of a working medium. Here, the thermal energy existing in a natural world refers to heat that uses water such as seawater, river water, or lake water, as a heat source, solar heat, geothermal heat, air (atmospheric) heat, or the like. In other words, the thermal energy existing in a natural world refers to thermal energy that exist in a natural world and is renewable in a relatively short period.

As illustrated in FIGS. 1 to 4, the working medium property difference power generation system according to the present invention includes a first working medium line L1 that circulates a first working medium W1, and a second working medium line L2 that circulates a second working medium W2. These first and second working medium lines L1 and L2 are pipes including known ducts, tubes, and the like, and power generation is performed by the first and second working medium lines L1 and L2 using two thermal cycles as described later.

In addition, in FIGS. 1 to 4, a hatched arrow indicates circulation of the first working medium W1, a black filled arrow indicates circulation of the second working medium W2, a white unfilled arrow indicates circulation of a third working medium W3, and a gray filled arrow indicates circulation of mixed fluid of the second working medium W2 and the third working medium W3.

A configuration on the first working medium line L1 and a configuration on the second working medium line L2 will be described in detail. First of all, the configuration on the first working medium line L1 includes a first heat exchanger 1A for performing thermal exchange between the first working medium W1 and a thermal source medium h, a first thermal engine 2A that takes out kinetic energy from the first working medium W1 heated by the first heat exchanger 1A, and a first power generator 3A that converts the kinetic energy taken out by the first thermal engine 2A, into electrical energy.

In contrast to this, the configuration on the second working medium line L2 includes a second heat exchanger 1B for performing thermal exchange between the second working medium W2 and the thermal source medium h, a third working medium supply means 5 that supplies the third working medium W3 to be mixed with the second working medium W2 heated by the second heat exchanger 1B, a mixing means 6 that mixes the second working medium W2 and the third working medium W3, a second thermal engine 2B that takes out kinetic energy from the mixed fluid (W2+W3) of the second working medium W2 and the third working medium W3, and a second power generator 3B that converts the kinetic energy taken out by the second thermal engine 2B, into electrical energy.

In addition, it is preferable that both of the first thermal engine 2A on the first working medium line L1 and the second thermal engine 2B on the second working medium line L2 are external-combustion engines such as, for example, external-combustion structured turbines such as known steam turbines, known free pistons, known rotaries, or the like. This is because an external-combustion engine can take out kinetic energy based on the expansion of a working medium itself without involving combustion, and effectively utilize thermal energy existing in the natural world. Nevertheless, the present invention does not exclude using an internal-combustion engine as the first thermal engine 2A and/or the second thermal engine 2B.

In addition, on both of the downstream side of the first thermal engine 2A on the first working medium line L1 and the downstream side of the second thermal engine 2B on the second working medium line L2, a third heat exchanger 1C for performing thermal exchange between the first working medium W1 discharged from the first thermal engine 2A, and the mixed fluid of the second working medium W2 and the third working medium W3 that is discharged from the second thermal engine 2B is included, and a third working medium discharge means 10 for discharging the third working medium W3 to the third heat exchanger 1C is included.

In addition, a first pump 4A for circulating the first working medium W1 being in a liquid state is included between the third heat exchanger 1C and the first heat exchanger 1A on the first working medium line L1, and a second pump 4B for circulating the second working medium W2 being in a liquid state is included between the second heat exchanger 1B and the mixing means 6 on the second working medium line L2. In addition, preferably, a pressure pump is used as the second pump 4B, and after pressure is applied to the second working medium W2, the second working medium W2 is supplied to the mixing means 6.

Here, each of the working media W1, W2, and W3 will be described. As the first working medium W1, fluid having a boiling point lower than the temperature of the thermal source medium h flowing into the first heat exchanger 1A is used. Thus, the first working medium W1 is heated and evaporated by the first heat exchanger 1A, and supplied as gas to the first thermal engine 2A. In addition, as the second working medium W2, fluid having a boiling point higher and a melting point lower than the temperature of the thermal source medium h flowing into the second heat exchanger 1B is used. Thus, the second working medium W2 is supplied to the mixing means 6 while remaining as liquid even after being heated by the second heat exchanger 1B. In addition, as the third working medium W3, fluid having a boiling point lower than a freezing point of the second working medium W2 is used. Thus, the third working medium W3 is gas at the temperature at which at least the second working medium W2 is liquid.

As the first working medium W1, fluid used in a known binary power generation system can be used, and for example, pentane, isobutane, ammonia, ammonia-water mixture, or hydrochlorofluorocarbon is used. In addition, as the second working medium W2, for example, water can be used, and as the third working medium, for example, air (atmosphere) can be used.

Figure 5:
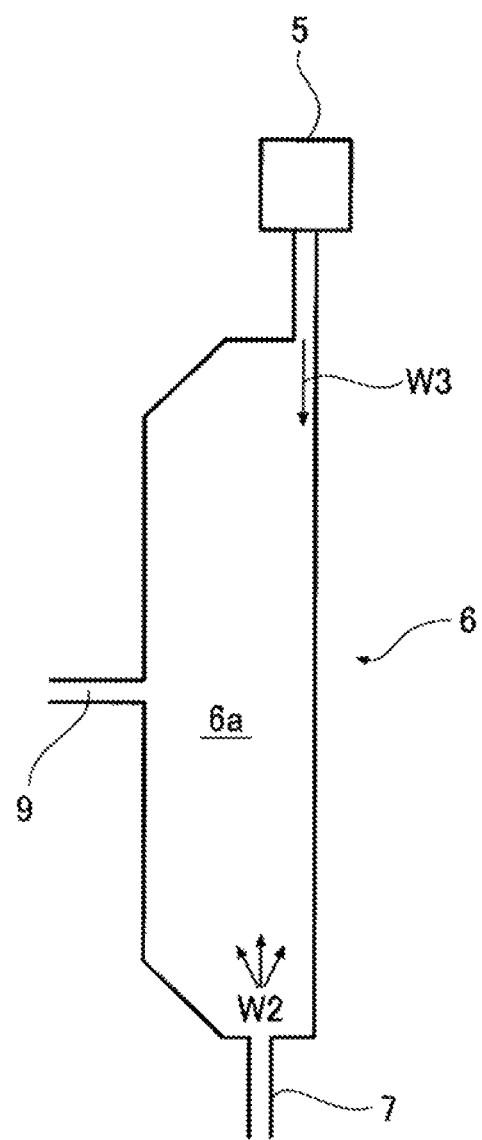
FIG. 5 is a schematic diagram of a mixing means of a second working medium and a third working medium.

As illustrated in FIG. 5, the above-described mixing means 6 has an enclosed space 6a, and in the enclosed space 6a, mixes the third working medium W3 supplied via the third working medium supply means 5, and the second working medium W2 supplied via a second working medium supply means 7.

Preferably, the second working medium supply means 7 includes a spray means such as a nozzle, and mixes the second working medium W2 with the third working medium W3 to make mix gas by spraying droplets of the second working medium W2 being liquid, into the third working medium W3 being gas. In other words, the droplets of the second working medium W2 mixed into the third working medium W3 are brought into gas-liquid contact with the third working medium W3, draw thermal energy of the third working medium W3, and exist in the third working medium W3 while holding the thermal energy as evaporative latent heat. At this time, volume of the third working medium W3 decreases and density thereof becomes higher.

In addition, more preferably, the mixing means 6 includes a differential pressure complementing means 9, that is to say, a means for complementing pressure (differential pressure) decreased by the mixing of the second working medium W2 into the third working medium W3. As the differential pressure complementing means 9, a known air blower such as a pressure fan, a fan, or a blower, or a known compressor can be used.

In addition, on the second working medium line L2, a compactor 8 is included between the mixing means 6 and the second thermal engine 2B, and mix gas of the second working medium W2 and the third working medium W3 is supplied to the second thermal engine 2B after being adjusted to appropriate pressure. Here, in the present invention, density of the third working medium W3 including the second working medium W2 can be made high by the mixing means 6, and kinetic energy can be effectively taken out by the second thermal engine 2B without applying excessive pressure. In addition, in the present invention, if pressure can be adjusted to appropriate pressure by the mixing means 6, the compactor 8 can be arbitrarily omitted according to the implementation.

The working medium property difference power generation system according to the present invention that includes the above-described basic configuration compositely uses two thermal cycles that are based on the first working medium line L1 and the second working medium line L2, and three working media of the first working medium W1, the second working medium W2, and the third working medium W3.

Then, utilizing the property of each of the working media W1, W2, and W3, thermal energy can be effectively transmitted from the first working medium W1 circulating the first working medium line L1 to the second working medium W2 circulating the second working medium line L2, and the second thermal engine 2B can convert the given thermal energy into kinetic energy in cooperation of the second working medium W2 and the third working medium W3, and the second power generator 3B can eventually convert the kinetic energy into electrical energy.

Figure 2:
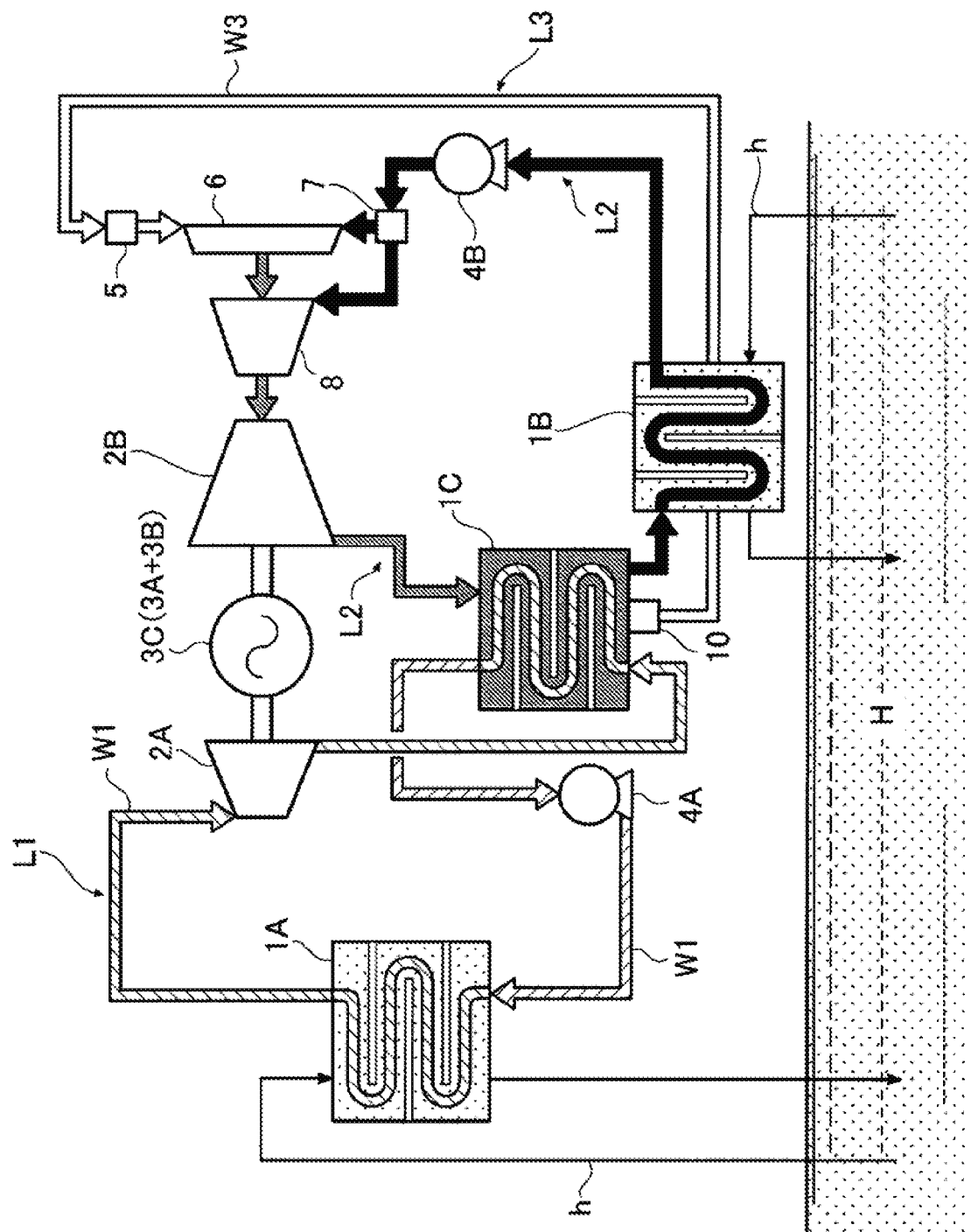
FIG. 2 is a schematic diagram of a working medium property difference power generation system according to a second embodiment.
Figure 3:
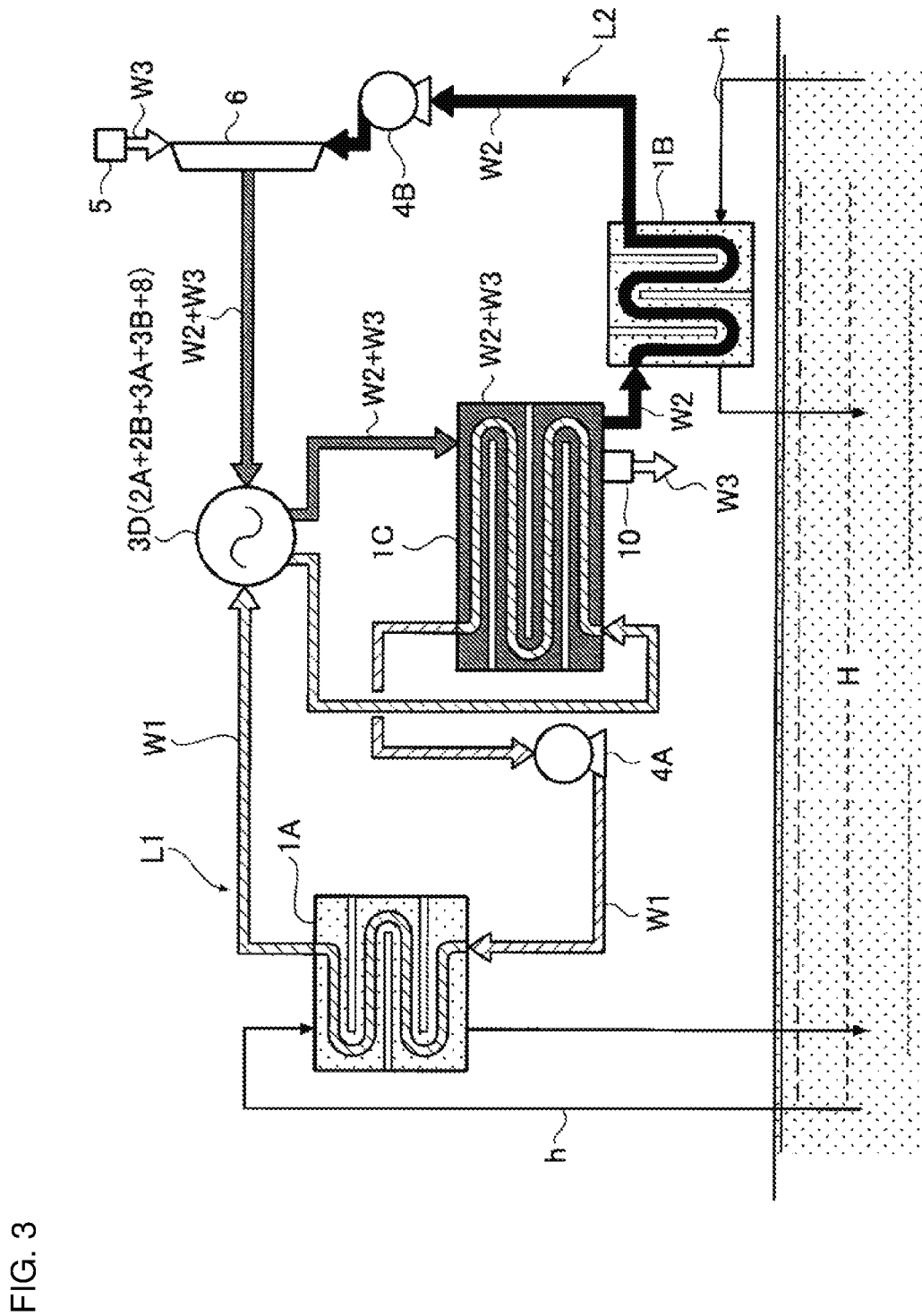
FIG. 3 is a schematic diagram of a working medium property difference power generation system according to a third embodiment.
Figure 4:
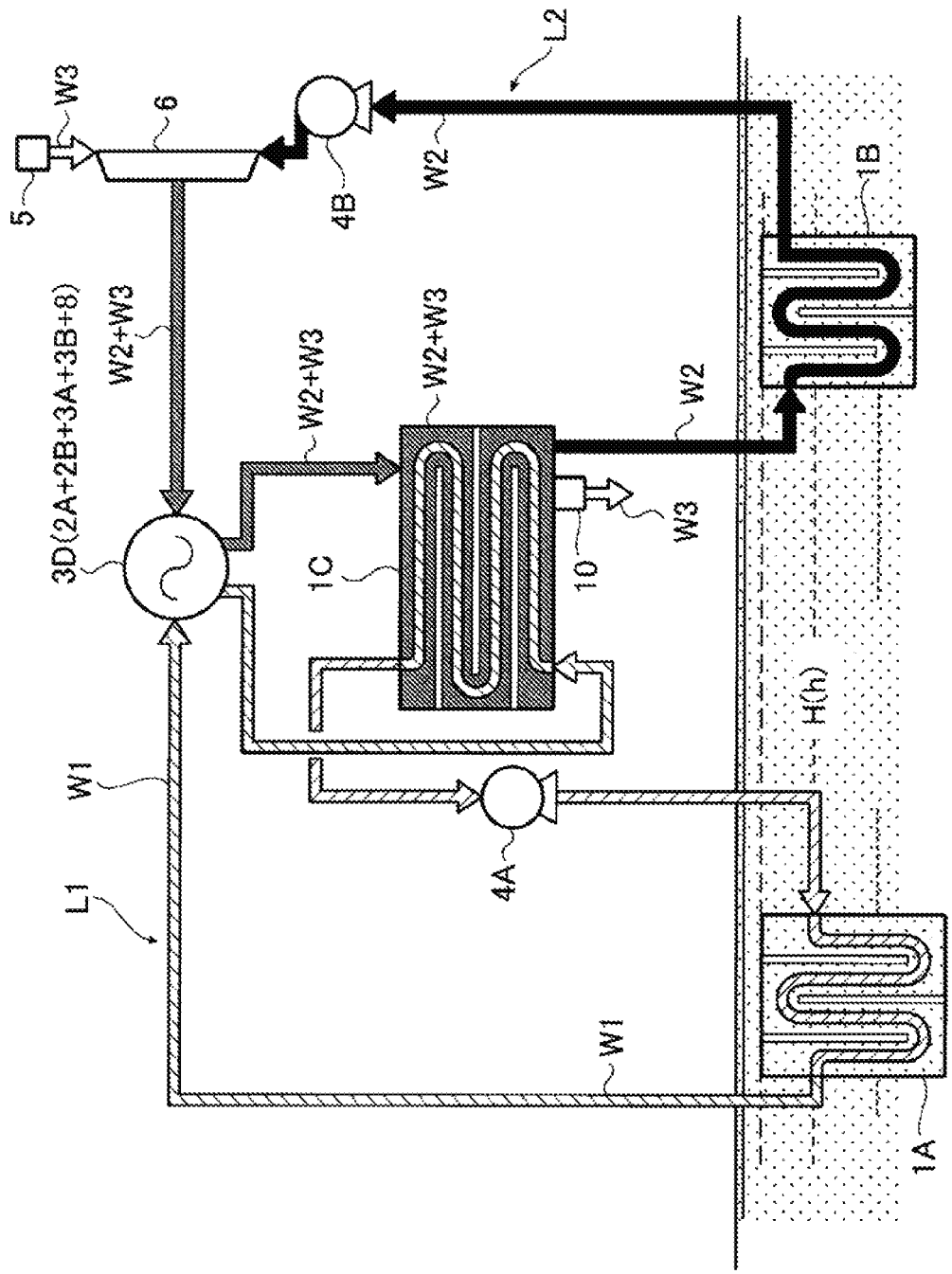
FIG. 4 is a schematic diagram of a working medium property difference power generation system according to a fourth embodiment.

Detailed Configuration of Working Medium Property Difference Power Generation System FIG. 1 illustrates a first embodiment of the working medium property difference power generation system according to the present invention, and similarly, FIG. 2 illustrates a second embodiment, FIG. 3 illustrates a third embodiment, and FIG. 4 illustrates a fourth embodiment. In each of these embodiments, thermal energy that uses water such as seawater, among thermal energies existing in the natural world, as a heat source, can be used as a common thermal source H of the first heat exchanger 1A and the second heat exchanger 1B, thermal energy in the natural world can be effectively used, and the entire system can be made compact. Nevertheless, the present invention is not limited to this, and other thermal energy existing in the natural world, such as, for example, solar heat, geothermal heat, or air heat can be used as the thermal source H, and different thermal energies in the natural world may be used as the thermal source H in the first heat exchanger 1A and the thermal source H in the second heat exchanger 1B. Hereinafter, the detailed configuration will be described based on each embodiment.

First Embodiment

A working medium property difference power generation system of the first embodiment includes the above-described basic configuration as-is. In addition, atmosphere (air) is assumed to be used as the third working medium W3, the third working medium supply means 5 takes in and supplies atmosphere to the mixing means 6, and the third working medium discharge means 10 directly discharges the third working medium W3 from the third heat exchanger 1C to the atmosphere.

In addition, as the first power generator 3A and the second power generator 3B, known power generators such as a turbine power generator can be used, or power generators having a gas pressure cylinder structure of the third embodiment, which will be described later, can also be used.

When a power generator having a gas pressure cylinder structure is used as the first power generator 3A, the first working medium W1 is alternately supplied to a left gas pressure chamber and a right gas pressure chamber, and similarly, when a power generator having a gas pressure cylinder structure is used as the second power generator 3B, mix gas (W2+W3) of the second working medium W2 and the third working medium W3 is alternately supplied to the left gas pressure chamber and the right gas pressure chamber.

Second Embodiment

In place of the configuration of separately including the first power generator 3A and the second power generator 3B on the first working medium line L1 and on the second working medium line L2, as in the system of the first embodiment, a working medium property difference power generation system of the second embodiment has a configuration of including one common power generator (serving as both of the first power generator and the second power generator: 3A+3B) 3C serving as these first and second power generators 3A and 3B.

A known power generator can be used as the power generator 3C, and electrical energy is obtained using kinetic energy converted from thermal energy of the first working medium W1, and kinetic energy converted from thermal energy of mix gas of the second working medium W2 and the third working medium W3. Preferably, if a power generator having a gas pressure cylinder structure, which will be described in the third embodiment, is used, power generation can be efficiently performed.

In addition, in the present embodiment, the second working medium W2 is supplied by the second working medium supply means 7 not only to the mixing means 6 but also to the compactor 8. The configuration can be naturally applied also to the above-described first embodiment, and the third embodiment and the fourth embodiment, which will be described later.

In addition, in the present embodiment, atmosphere is not used as the third working medium W3, and a third working medium line L3 is included assuming that another fluid being gas at room temperature and having a boiling point lower than the freezing point of the second working medium W2 is used. The third working medium line L3 can be naturally applied also to the above-described first embodiment, and the third embodiment and the fourth embodiment, which will be described later. In addition, the third working medium line L3 is also a pipe including a known duct, a tube, and the like.

Third Embodiment

For further achieving efficiency and a compact system more than the first and second embodiments, a working medium property difference power generation system of the third embodiment includes a power generator (serving as the first and second power generators, the first and second thermal engines, and the compactor: 2A+2B+3A+3B+8) 3D having the functions of the first and second power generators 3A and 3B, the first and second thermal engines 2A and 2B, and the compactor 8. In other words, a power generator includes a function of a thermal engine, and further includes a function of a compactor, and the power generator includes the first power generator 3A and the second power generator 3B.

The power generator 3D will be described in detail. As illustrated in FIGS. 6A to 6D, the power generator 3D has a gas pressure cylinder structure of alternately applying gas pressure in a left gas pressure chamber 14 contacting a left end wall 12 of a cylinder 11, and gas pressure in a right gas pressure chamber 15 contacting the right end wall 13 to a piston (free piston) 16 in the cylinder 11, and reciprocating the piston 16 in an axis line direction.

In addition, a permanent magnet zone 19 is formed between a left pressure receiving surface 17 contacting the left gas pressure chamber 14 of the piston 16, and a right pressure receiving surface 18 contacting the right gas pressure chamber 15, an electrogenic coil zone 21 extending over the left and right gas pressure chambers 14 and 15 is formed on a cylindrical wall between the left and right end walls 12 and 13 of the cylinder 11, and power generation in the electrogenic coil zone 21 is induced by the reciprocation in the axis line direction of the piston 16 having the permanent magnet zone 19. In addition, in contract to the above configuration, a configuration including an electrogenic coil zone on the piston 16 side, and a permanent magnet zone on the cylinder 11 side can also be arbitrarily employed according to the implementation.

In addition, the piston 16 has a cylindrical piston structure in which a permanent magnet cylindrical member 16' having a structure of integrally and coaxially stacking a plurality of rings 16a including permanent magnets is externally inserted into a cylindrical yoke 20, and both end opened surfaces of a cylindrical hole 23 of the cylindrical yoke 20 are closed by a pressure receiving end plate 24. The length of the piston 16 (permanent magnet zone 19) can be increased or decreased by increasing or decreasing the number of stacked rings 16a.

In addition, according to a known electromagnetic induction principle, the permanent magnet cylindrical member 16' is arranged so as to have such a polarity that a magnetic line of the permanent magnets effectively act on electrogenic coils in the electrogenic coil zone 21. In addition, the electrogenic coils forming the electrogenic coil zone 21 are sometimes formed by a plurality of unit electrogenic coil groups according to the above pole arrangement. In addition, an annular seal 25 for achieving airtight closure with the inner circumferential surface of the cylinder 11 is provided on the outer circumferential surface of the pressure receiving end plate 24. In addition, the annular seals 25 may be provided on both end outer circumferential surfaces of the permanent magnet cylindrical member 16', which are not specifically illustrated. Preferably, the pressure receiving end plate 24 is formed by a heat-resistant plate including a ceramic board, a fiber board, a stone board, a concrete board, a carbon board, a metal board, or the like.

Then, supply of the first working medium W1 into the left gas pressure chamber 14 through a left supply port 26, and supply of mix gas of the second working medium W2 and the third working medium W3 into the right gas pressure chamber 15 through a right supply port 27 are alternately performed, and the piston 16 is reciprocated in the axis line direction in cooperation of gas pressure of the first working medium W1, and gas pressure of the mix gas of the second working medium W2 and the third working medium W3. In addition, the first working medium W1 is discharged from a left discharge port 28 when the piston 16 ends a rightward movement, and the mix gas of the second working medium W2 and the third working medium W3 is discharged from a right discharge port 29 when the piston 16 ends a leftward movement.

Thus, kinetic energy can be obtained by the power generator 3D from the first working medium W1 and the kinetic energy can be converted into electrical energy. Similarly, kinetic energy can be obtained from the mix gas of the second working medium W2 and the third working medium W3, and the kinetic energy can be converted into electrical energy. Thus, the power generator 3D can also serve as the first and second power generators 3A and 3B and the first and second thermal engines 2A and 2B of the basic configuration.

Figure 6A:
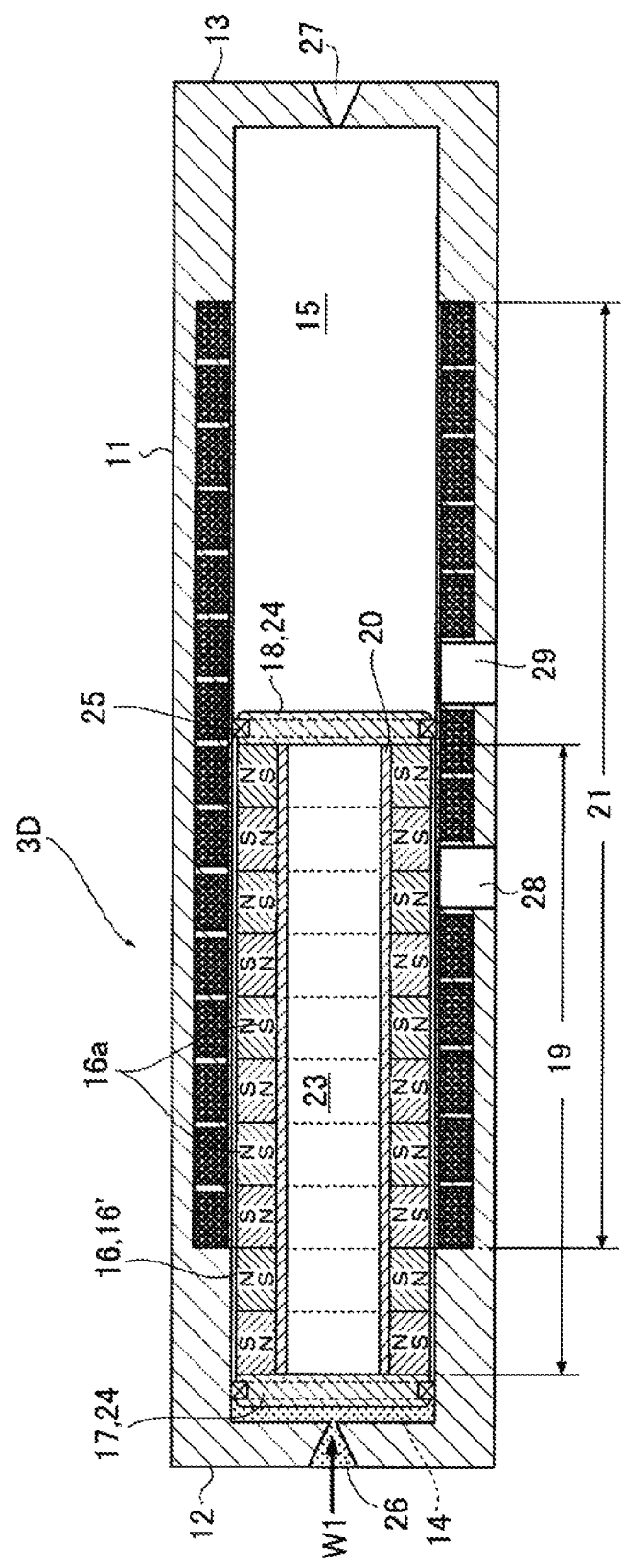
FIG. 6A is a vertical cross-sectional view illustrating a state in supplying a first working medium in a power generator having a gas pressure cylinder structure.
Figure 6B:
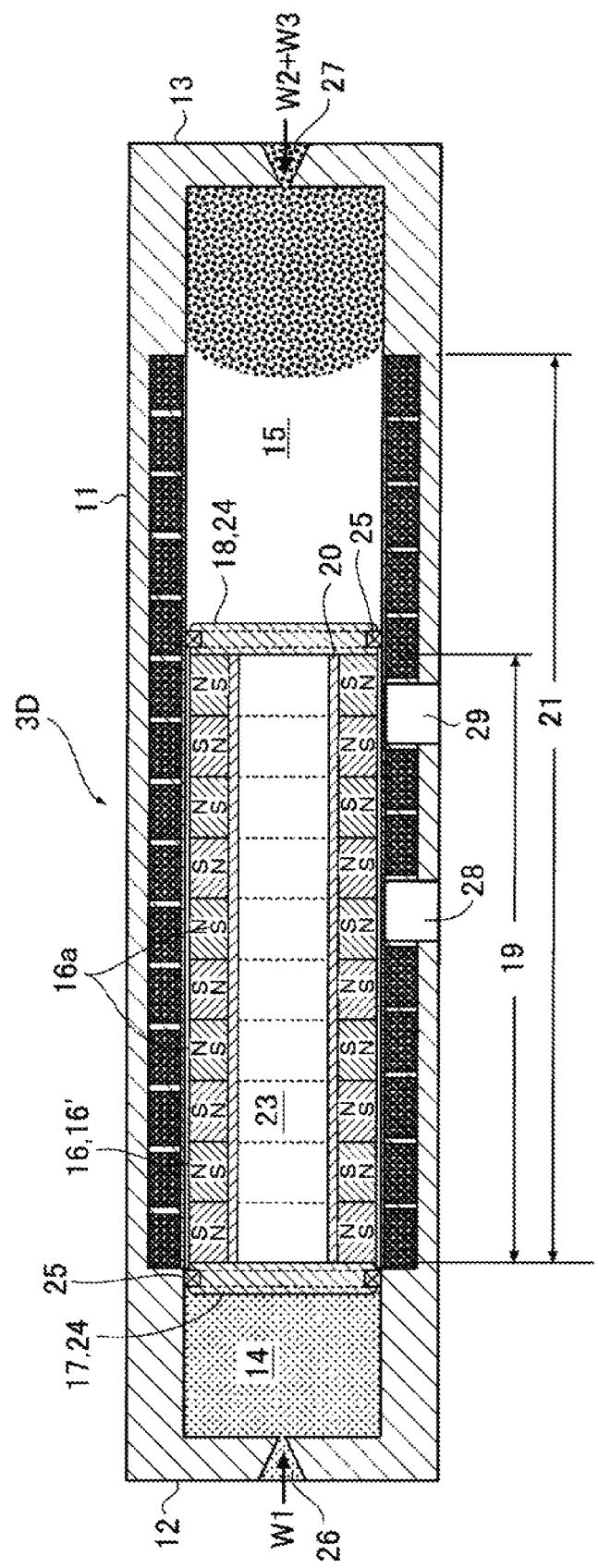
FIG. 6B is a vertical cross-sectional view illustrating a state in supplying mix gas of a second working medium and a third working medium in a power generator having a gas pressure cylinder structure.
Figure 6C:
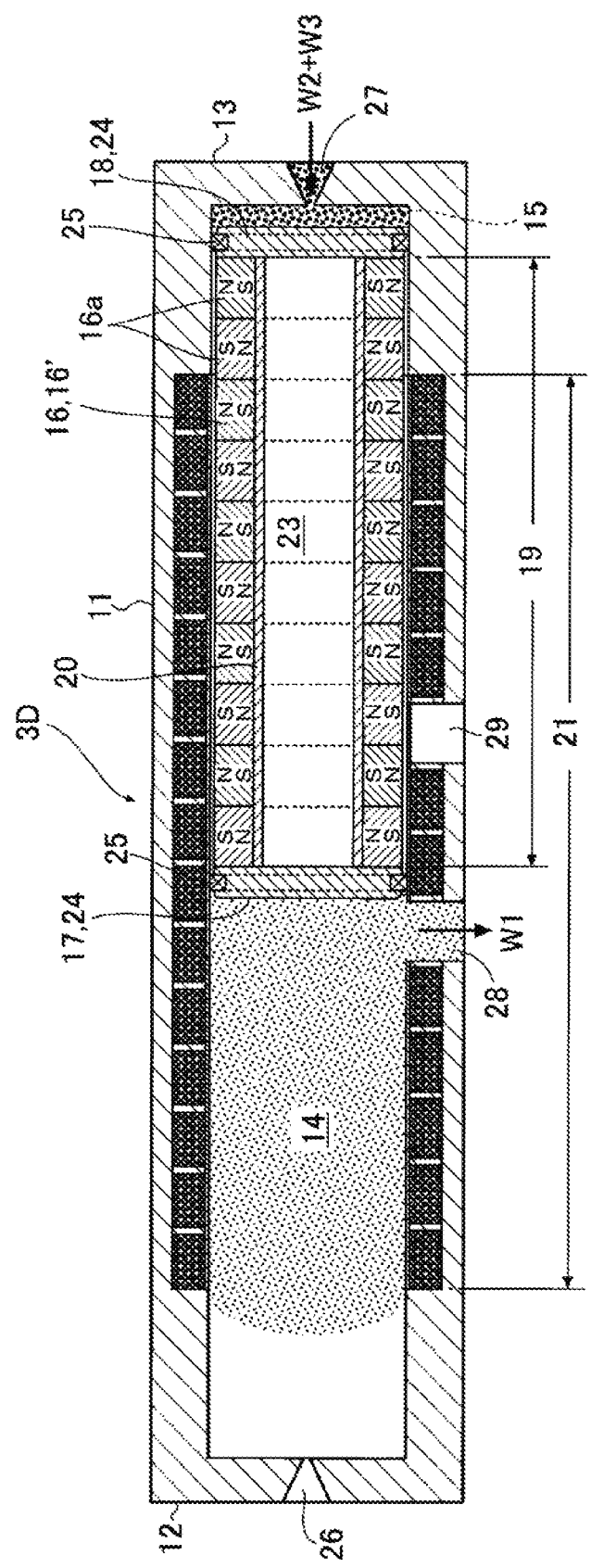
FIG. 6C is a vertical cross-sectional view illustrating a state in discharging a first working medium in a power generator having a gas pressure cylinder structure.
Figure 6D:
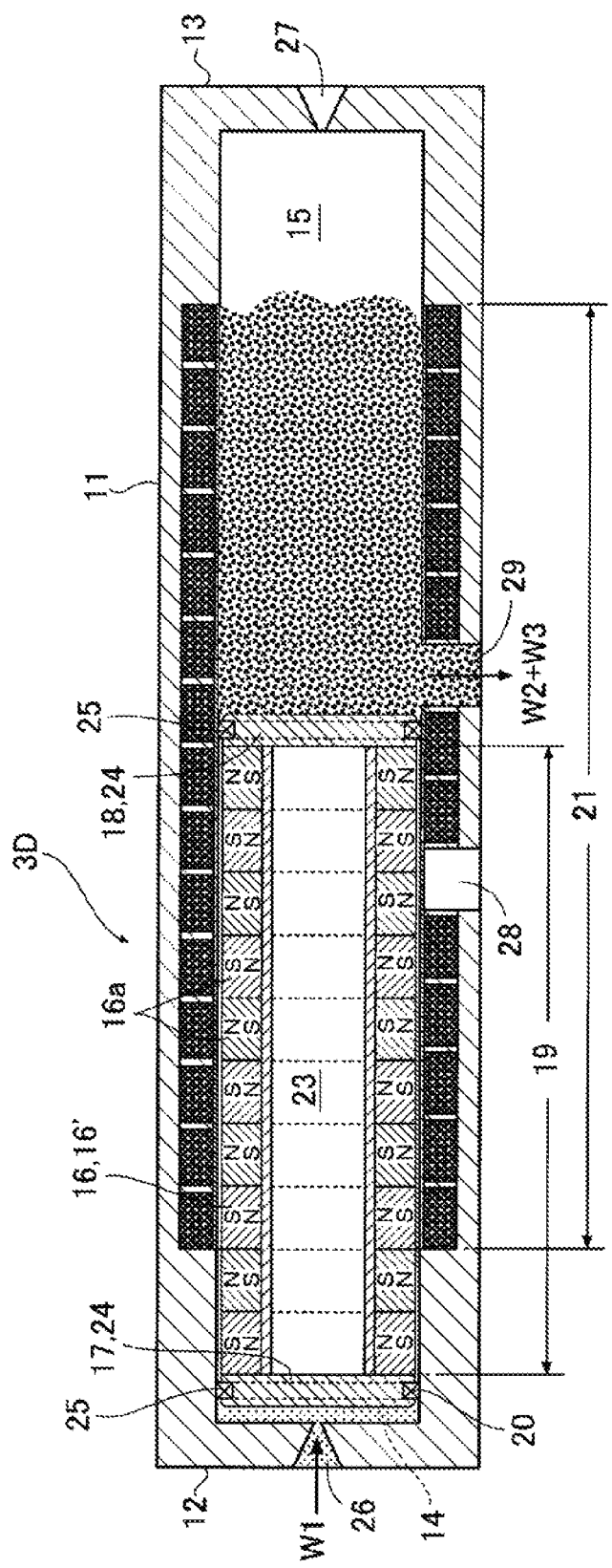
FIG. 6D is a vertical cross-sectional view illustrating a state in discharging mix gas of a second working medium and a third working medium in a power generator having a gas pressure cylinder structure.

Furthermore, as illustrated in FIG. 6B, when the piston 16 is moved rightward by the first working medium W1 supplied from the left supply port 26 to the left gas pressure chamber 14, that is to say, when the volume of the right gas pressure chamber 15 is decreased by the piston 16, if mix gas of the second working medium W2 and the third working medium W3 is supplied to the right gas pressure chamber 15 from the right supply port 27, the mix gas of the second working medium W2 and the third working medium W3 is compacted by the piston 16. Thus, the power generator 3D can also serve as the compactor 8 of the basic configuration. In addition, when the compactor 8 is omitted, it is only required that the mix gas of the second working medium W2 and the third working medium W3 is supplied to the right gas pressure chamber 15 from the right supply port 27, when the rightward movement of the piston 16 ends, which is not specifically illustrated.

Figure 7A:
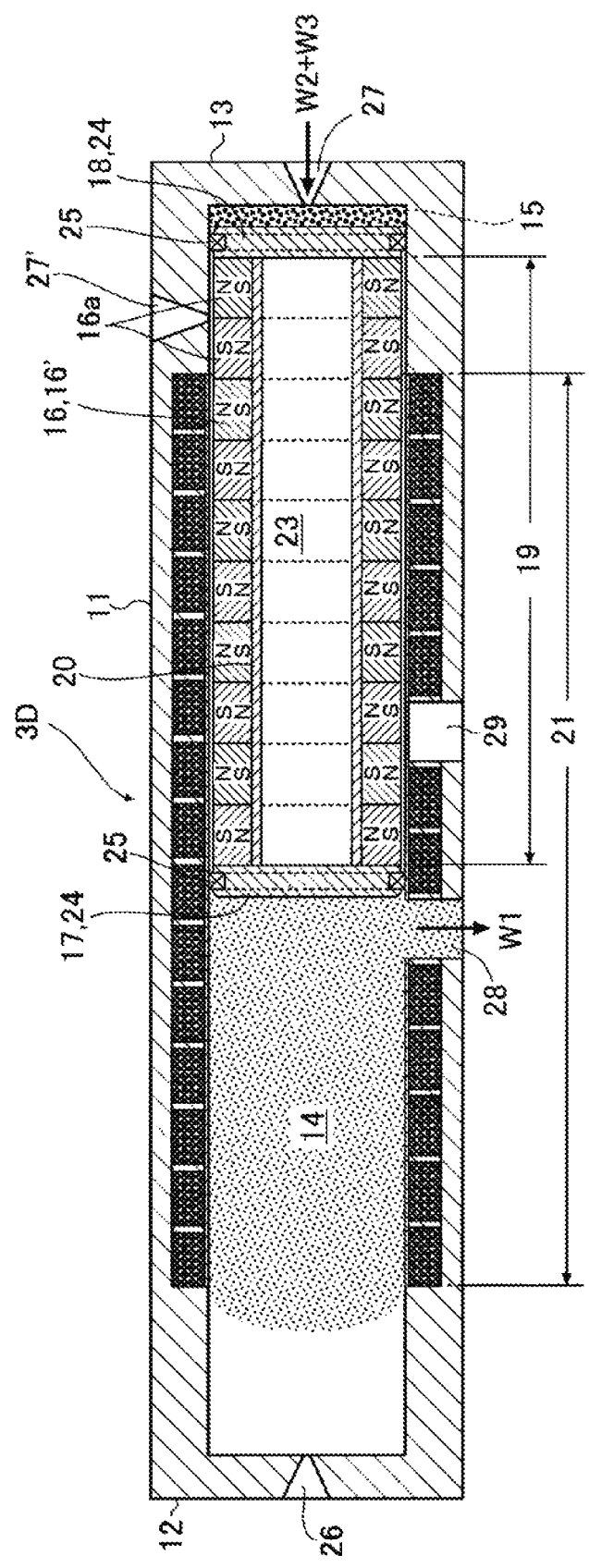
FIG. 7A is a vertical cross-sectional view illustrating a state in supplying mix gas of a second working medium and a third working medium in a power generator having a gas pressure cylinder structure.
Figure 7B:
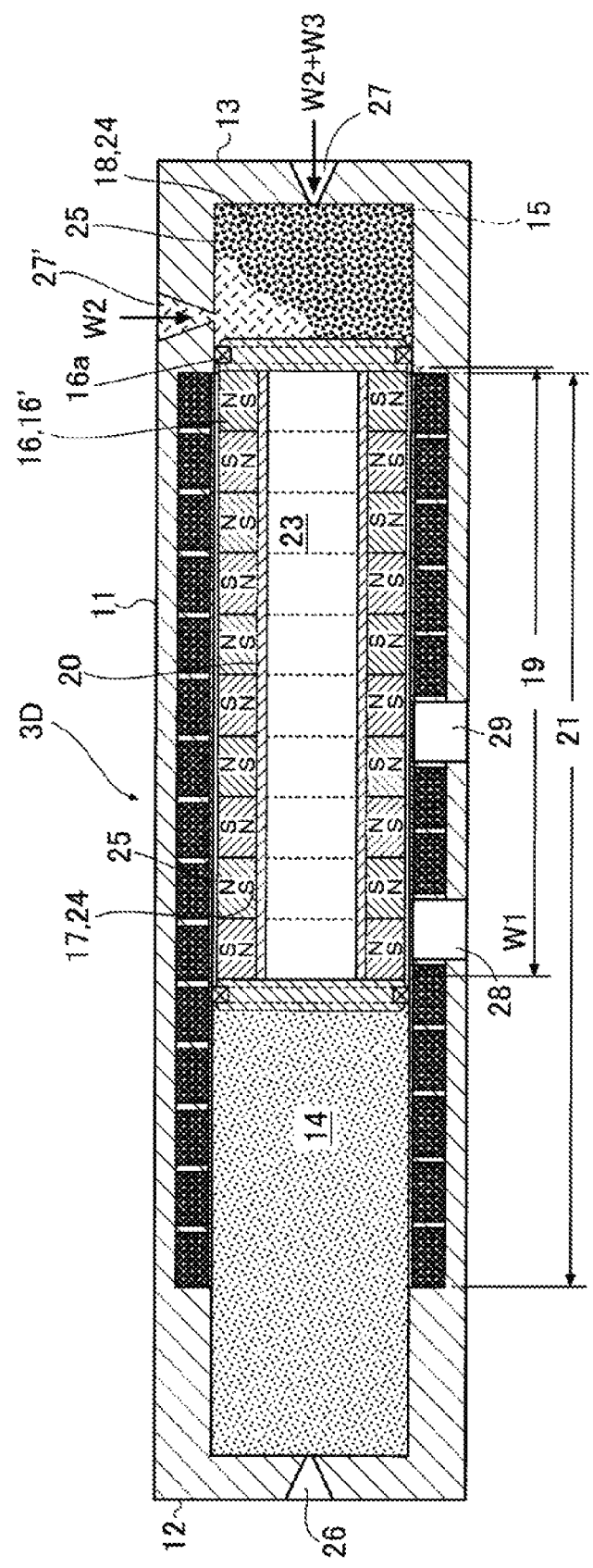
FIG. 7B is a vertical cross-sectional view illustrating a state in additionally supplying a second working medium in a power generator having a gas pressure cylinder structure.

In addition, as illustrated in FIGS. 7A to 7C, if an additional supply port 27' is provided in the right gas pressure chamber 15 of the power generator D and the second working medium W2 is additionally supplied, the piston 16 can be moved further efficiently.

In other words, as illustrated in FIG. 7A, if the second working medium W2 is additionally supplied from the additional supply port 27' when the mix gas of the second working medium W2 and the third working medium W3 supplied from the right supply port 27 is compacted, and then, as illustrated in FIG. 7B, the piston 16 starts a leftward movement and passes through the additional supply port 27', the mix gas of the second working medium W2 and the third working medium W3 is complemented by the additional second working medium W2 and the leftward movement of the piston 16 is sustained.

In other words, at this time, because the third working medium W3 is uncondensed air at a condensation point of the second working medium W2 or uncondensed air at a freezing point of the second working medium W2, the third working medium W3 recovers condensation heat or freezing heat released by the second working medium W2 at a condensation point or a freezing point, the third working medium W3 expands by the heat recovery, the gas pressure is applied to the piston 16, and the movement of the piston 16 is sustained.

After that, the mix gas with the third working medium W3 including the added second working medium W2 is discharged from the right discharge port 29 as illustrated in FIG. 7C.

In addition, because the right gas pressure chamber 15 provided with the additional supply port 27' is a portion that can serve as the function of the compactor 8, which is not specifically illustrated, if the second working medium W2 is additionally supplied from the additional supply port 27' simultaneously with the mix gas of the second working medium W2 and the third working medium W3 being supplied from the right supply port 27, the second working medium W2 can be supplied by the second working medium supply means 7 also to the compactor 8 as in the second embodiment.

Fourth Embodiment

A working medium property difference power generation system of the fourth embodiment has a system configuration similar to that of the third embodiment except that the first working medium W1 and the second working medium W2 directly perform thermal exchange with seawater or the like that serves as the thermal source H and the thermal source medium h. In other words, the first heat exchanger 1A and the second heat exchanger 1B are arranged in the thermal source H. Thus, a system configuration can be made more compact.

Working Medium Property Difference Power Generation Method

A power generation method that uses the above-described working medium property difference power generation system according to the present invention will be described in detail based on FIGS. 1 to 4. As described above, as the first working medium W1, fluid having a boiling point lower than the temperature of the thermal source medium h flowing into the first heat exchanger 1A is used, as the second working medium W2, fluid having a boiling point higher and a melting point lower than the temperature of the thermal source medium h flowing into the second heat exchanger 1B is used, and as the third working medium W3, fluid having a boiling point lower than a freezing point of the second working medium W2 is used. As exemplification, as the first working medium W1, pentane, isobutane, ammonia, ammonia-water mixture, or hydrochlorofluorocarbon can be used, as the second working medium W2, water can be used, and as the third working medium W3, air (atmosphere) can be used.

First of all, on the first working medium line L1, the first working medium W1 is heated and evaporated by the first heat exchanger 1A by performing thermal exchange with the thermal source medium h. The first working medium W1 turned into gas is supplied to the first thermal engine 2A, owned thermal energy is converted by the first thermal engine 2A into kinetic energy, and the kinetic energy is converted by the first power generator 3A into electrical energy.

The first working medium W1 discharged from the first thermal engine 2A, that is to say, the used first working medium W1 is cooled and condensed by the third heat exchanger 1C by performing thermal exchange with used mix gas of the second working medium W2 and the third working medium W3(W2+W3), which will be described later. In other words, the used mix gas of the second working medium W2 and the third working medium W3 (in some cases, the second working medium W2 becomes liquid or solid) is cold source medium of the first working medium W1. Then, the first working medium W1 turned into liquid is supplied again by the first pump 4A to the first heat exchanger 1A, and circulates.

In contrast to this, on the second working medium line L2, the second working medium W2 is heated by the second heat exchanger 1B by performing thermal exchange with the thermal source medium h. Because the second working medium W2 is fluid having a boiling point higher than the temperature of the thermal source medium h, and a melting point lower than the temperature of the thermal source medium h, as described above, the second working medium W2 remains in a liquid state even after passing through the second heat exchanger 1B, is circulated by the second pump 4B, and is supplied to the mixing means 6 via the second working medium supply means 7. In addition, if a pressure pump is used as the second pump 4B, after pressure is applied to the second working medium W2, the second working medium W2 can be supplied to the mixing means 6.

As illustrated in FIG. 5, in the enclosed space 6a of the mixing means 6, the second working medium W2 is sprayed by the second working medium supply means 7 as minute droplets, and is mixed with the third working medium W3 supplied into the enclosed space 6a by the third working medium supply means 5. Because the third working medium W3 is fluid having a boiling point lower than a freezing point of the second working medium W2 as described above, the third working medium W3 is gas when the second working medium W2 is liquid, as described above. Thus, when the droplets of the second working medium W2 are sprayed into the third working medium W3, mix gas including the third working medium W3 including the second working medium W2 and having high density is generated.

At this time, the third working medium W3 decreases in thermal energy and declines in pressure by the droplets of the second working medium W2, but the decreased thermal energy is owned by the droplets of the second working medium W2 as evaporative latent heat. In other words, the droplets of the second working medium W2 enter a state of holding thermal energy drawn from the third working medium W3, as evaporative latent heat, and existing in the third working medium W3. In addition, in the present invention, a case in which, in the third working medium W3, the droplets of the second working medium W2 are partially vaporized and become wet vapor is not excluded.

The mix gas of the second working medium W2 and the third working medium W3 mixed in the above-described manner is preferably complemented by the differential pressure complementing means 9 with differential pressure (pressure declined by mixing), and supplied to the compactor 8. Alternatively, when the compactor 8 is omitted, the mix gas is supplied to the second thermal engine 2B. As the differential pressure complementing means 9, a known air blower such as a pressure fan, a fan, or a blower, or a known compressor can be used as described above. In particular, if an air blower is used as the differential pressure complementing means 9, because differential pressure can be complemented in a supply process to the compactor 8 or the second thermal engine 2B, differential pressure complementing and supply can be efficiently performed.

The mix gas of the second working medium W2 and the third working medium W3 supplied to the compactor 8 is adjusted to appropriate pressure, thermal energy is converted by the second thermal engine 2B into kinetic energy, and the kinetic energy is converted by the second power generator 3B into electrical energy.

In the second thermal engine 2B, the third working medium W3 including the second working medium W2 and having high density effectively expands, and converts thermal energy into kinetic energy. In other words, in the second thermal engine 2B, the second working medium W2 releases freezing heat or condensation heat, and the third working medium W3 recovers the released freezing heat or condensation heat and effectively expands. Thus, the third working medium W3 including the second working medium W2 turned into solid or liquid becomes cryogenic temperature and is discharged from the second thermal engine 2B. Thus, as described above, in the third heat exchanger 1C, the third working medium W3 can be effectively used as a cold source medium of the first working medium W1.

The mix gas of the second working medium W2 and the third working medium W3 that has been heated by the used first working medium W1 in the third heat exchanger 1C is subjected to liquid-vapor separation, and the second working medium W2 in a liquid state is supplied again to the second heat exchanger 1B, and the third working medium W3 in a gas state is discharged by the third working medium discharge means 10. The third working medium W3 to be discharged may be discharged to the atmosphere as described in the power generation systems of the first, third, and fourth embodiments, or may be circulated to the third working medium supply means 5 via the third working medium line L3 as described in the power generation system of the second embodiment.

In addition, as described in the power generation system of the second embodiment, the second working medium W2 can be supplied by the second working medium supply means 7 not only to the mixing means 6 but also to the compactor 8. In this case, pressure of the mix gas of the second working medium W2 and the third working medium W3 generated by the mixing means 6 can be complemented, and density of the third working medium W3 in the mix gas can be made further higher, and kinetic energy can be surely taken out in the second thermal engine 2B.

Furthermore, when one common power generator (first power generator and second power generator) 3C that serves as the first and second power generators 3A and 3B is used as in the power generation system of the second embodiment, and the power generator (first and second power generators and first and second thermal engines and compactor) 3D that serves as the functions of the first and second power generators 3A and 3B, the first and second thermal engines 2A and 2B, and the compactor 8 is used as in the power generation systems of the third and fourth embodiments, more efficient power generation is enabled.

The present invention compositely can use two thermal cycles and three working media, effectively transmit thermal energy from a working medium of one thermal cycle to a working medium of another thermal cycle while focusing attention on a property difference of each working medium, convert the given thermal energy into kinetic energy by the cooperation of two types of working media, and eventually convert the kinetic energy into electrical energy.

Thus, thermal energy to be given to each working medium can be covered by thermal energy in the natural world, and the given thermal energy can be used with economy even if the given thermal energy is at low level. In other words, thermal energy having relatively low temperature with a little difference from air temperature can be used as a thermal source, and power generation can be performed while suppressing loss of thermal energy as far as possible.

The power generation system and the power generation method according to the present invention enable power supply to be performed safely and at low cost without applying environmental load. Thus, industrial applicability is considerably high as a substitute of a power generation system and a power generation method that use fossil fuel or atomic energy.

REFERENCE SIGNS LIST

1A FIRST HEAT EXCHANGER
1B SECOND HEAT EXCHANGER
1C THIRD HEAT EXCHANGER
2A FIRST THERMAL ENGINE
2B SECOND THERMAL ENGINE
3A FIRST POWER GENERATOR
3B SECOND POWER GENERATOR
3C POWER GENERATOR (FIRST POWER GENERATOR AND SECOND POWER GENERATOR)
3D POWER GENERATOR (FIRST AND SECOND POWER GENERATORS AND FIRST AND SECOND THERMAL ENGINES AND COMPACTOR)
4A FIRST PUMP
4B SECOND PUMP
5 THIRD WORKING MEDIUM SUPPLY MEANS
6 MIXING MEANS
6a ENCLOSED SPACE
7 SECOND WORKING MEDIUM SUPPLY MEANS
8 COMPACTOR
9 DIFFERENTIAL PRESSURE COMPLEMENTING MEANS
10 THIRD WORKING MEDIUM DISCHARGE MEANS
11 CYLINDER
12 LEFT END WALL
13 RIGHT END WALL
14 LEFT GAS PRESSURE CHAMBER
15 RIGHT GAS PRESSURE CHAMBER
16 PISTON
16' PERMANENT MAGNET CYLINDRICAL MEMBER
16a RING
17 LEFT PRESSURE RECEIVING SURFACE
18 RIGHT PRESSURE RECEIVING SURFACE
19 PERMANENT MAGNET ZONE
20 CYLINDRICAL YOKE
21 ELECTROGENIC COIL ZONE
23 CYLINDRICAL HOLE
24 PRESSURE RECEIVING END PLATE
25 ANNULAR SEAL
26 LEFT SUPPLY PORT
27 RIGHT SUPPLY PORT
27' ADDITIONAL SUPPLY PORT

28 LEFT DISCHARGE PORT
29 RIGHT DISCHARGE PORT
L1 FIRST WORKING MEDIUM LINE
L2 SECOND WORKING MEDIUM LINE
L3 THIRD WORKING MEDIUM LINE
W1 FIRST WORKING MEDIUM
W2 SECOND WORKING MEDIUM
W3 THIRD WORKING MEDIUM
H THERMAL SOURCE
h THERMAL SOURCE MEDIUM

The invention claimed is:

1. A working medium property difference power generation system that uses thermal energy existing in a natural world, as a thermal source of a working medium, the working medium property difference power generation system comprising configurations A to D described below:
   A: a first working medium line that circulates a first working medium, and a second working medium line that circulates a second working medium are included;
   B: a first heat exchanger for performing thermal exchange between the first working medium and a thermal source medium, a first thermal engine configured to take out kinetic energy from the first working medium heated by the first heat exchanger, and a first power generator configured to convert the kinetic energy taken out by the first thermal engine, into electrical energy are included on the first working medium line;
   C: a second heat exchanger for performing thermal exchange between the second working medium and a thermal source medium, a third working medium supply means configured to supply a third working medium to be mixed with the second working medium heated by the second heat exchanger, a mixing means configured to mix the second working medium and the third working medium, a second thermal engine configured to take out kinetic energy from mixed fluid of the second working medium and the third working medium, and a second power generator configured to convert the kinetic energy taken out by the second thermal engine, into electrical energy are included on the second working medium line; and
   D: on both of a downstream side of the first thermal engine of the first working medium line and a downstream side of the second thermal engine on the second working medium line, a third heat exchanger for performing thermal exchange between the first working medium discharged from the first thermal engine, and mixed fluid of the second working medium and the third working medium that is discharged from the second thermal engine is included, and a third working medium discharge means for discharging the third working medium to the third heat exchanger is included.

2. The working medium property difference power generation system according to claim 1, wherein a compactor configured to compact mixed fluid of the second working medium and the third working medium is included between the mixing means and the second thermal engine on the second working medium line.

3. The working medium property difference power generation system according to claim 1, wherein both of the first thermal engine and the second thermal engine are external-combustion engines.

4. The working medium property difference power generation system according to claim 1, wherein a thermal source of a thermal source medium flowing into the first heat exchanger and a thermal source of a thermal source medium flowing into the second heat exchanger are common.

5. The working medium property difference power generation system according to claim 3, wherein the first power generator has a configuration including a permanent magnet zone in one of a cylinder and a piston, including an electrogenic coil zone in another one thereof, and including the first thermal engine.

6. The working medium property difference power generation system according to claim 3, wherein the second power generator has a configuration including a permanent magnet zone in one of a cylinder and a piston, including an electrogenic coil zone in another one thereof, and including the second thermal engine.

7. The working medium property difference power generation system according to claim 1, wherein one common power generator is used as the first power generator and the second power generator.

8. A working medium property difference power generation method being a power generation method that uses the working medium property difference power generation system according to claim 1, the working medium property difference power generation method comprising using fluid having a boiling point lower than a temperature of a thermal source medium flowing into the first heat exchanger, as the first working medium, using fluid having a boiling point higher than a temperature of a thermal source medium flowing into the second heat exchanger, as the second working medium, and using fluid having a boiling point lower than a freezing point of the second working medium, as the third working medium.

9. The working medium property difference power generation method according to claim 8, wherein pentane, isobutane, ammonia, ammonia-water mixture, or hydrochlorofluorocarbon is used as the first working medium, water is used as the second working medium, and air is used as the third working medium.

10. The working medium property difference power generation method according to claim 8, wherein, in a mixing means configured to mix the second working medium and the third working medium, a droplet of the second working medium is sprayed into the third working medium.

11. The working medium property difference power generation method according to claim 10, wherein, after pressure declined by spraying of the droplet of the second working medium into the third working medium is complemented, mixed fluid of the second working medium and the third working medium is supplied to the second thermal engine.

12. The working medium property difference power generation method according to claim 11, wherein the complementing of the declined pressure is performed in a supply process from the mixing means to the second thermal engine.

13. The working medium property difference power generation method according to claim 11, wherein, in a supply process to the second thermal engine, mixed fluid of the second working medium and the third working medium is supplied, and the second working medium is further supplied.

14. The working medium property difference power generation system according to claim 2, wherein both of the first thermal engine and the second thermal engine are external-combustion engines.

15. The working medium property difference power generation system according to claim 2, wherein a thermal source of a thermal source medium flowing into the first heat exchanger and a thermal source of a thermal source medium flowing into the second heat exchanger are common.

16. The working medium property difference power generation system according to claim 3, wherein a thermal source of a thermal source medium flowing into the first heat exchanger and a thermal source of a thermal source medium flowing into the second heat exchanger are common.

17. The working medium property difference power generation system according to claim 14, wherein a thermal source of a thermal source medium flowing into the first heat exchanger and a thermal source of a thermal source medium flowing into the second heat exchanger are common.

18. The working medium property difference power generation system according to claim 4, wherein the first power generator has a configuration including a permanent magnet zone in one of a cylinder and a piston, including an electrogenic coil zone in another one thereof, and including the first thermal engine.

19. The working medium property difference power generation system according to claim 14, wherein the second power generator has a configuration including a permanent magnet zone in one of a cylinder and a piston, including an electrogenic coil zone in another one thereof, and including the second thermal engine.

20. The working medium property difference power generation system according to claim 2, wherein one common power generator is used as the first power generator and the second power generator.

* * * * *